Figure 6:
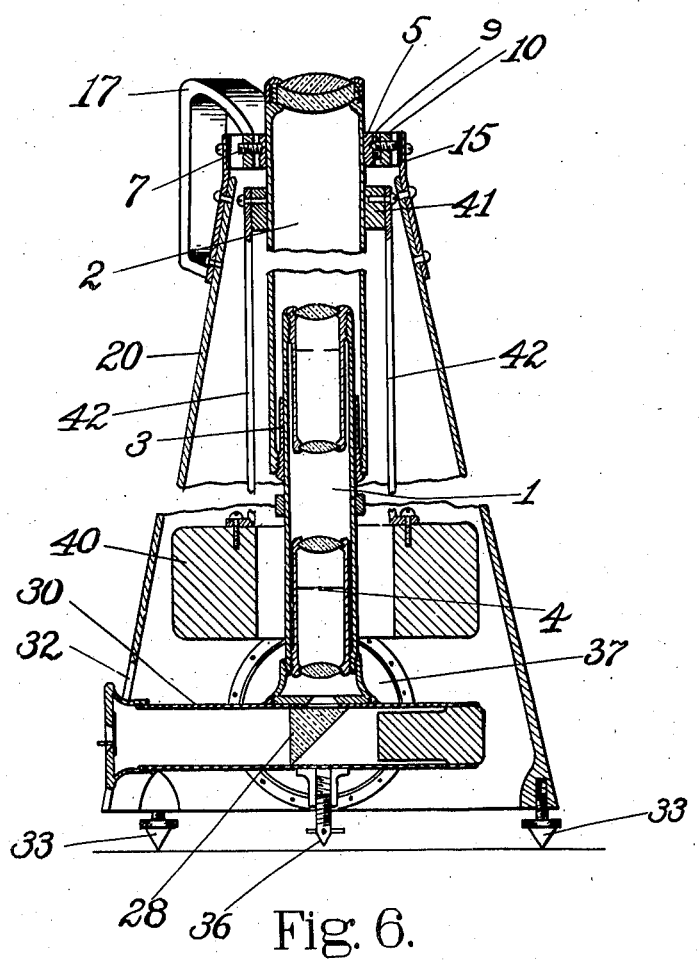

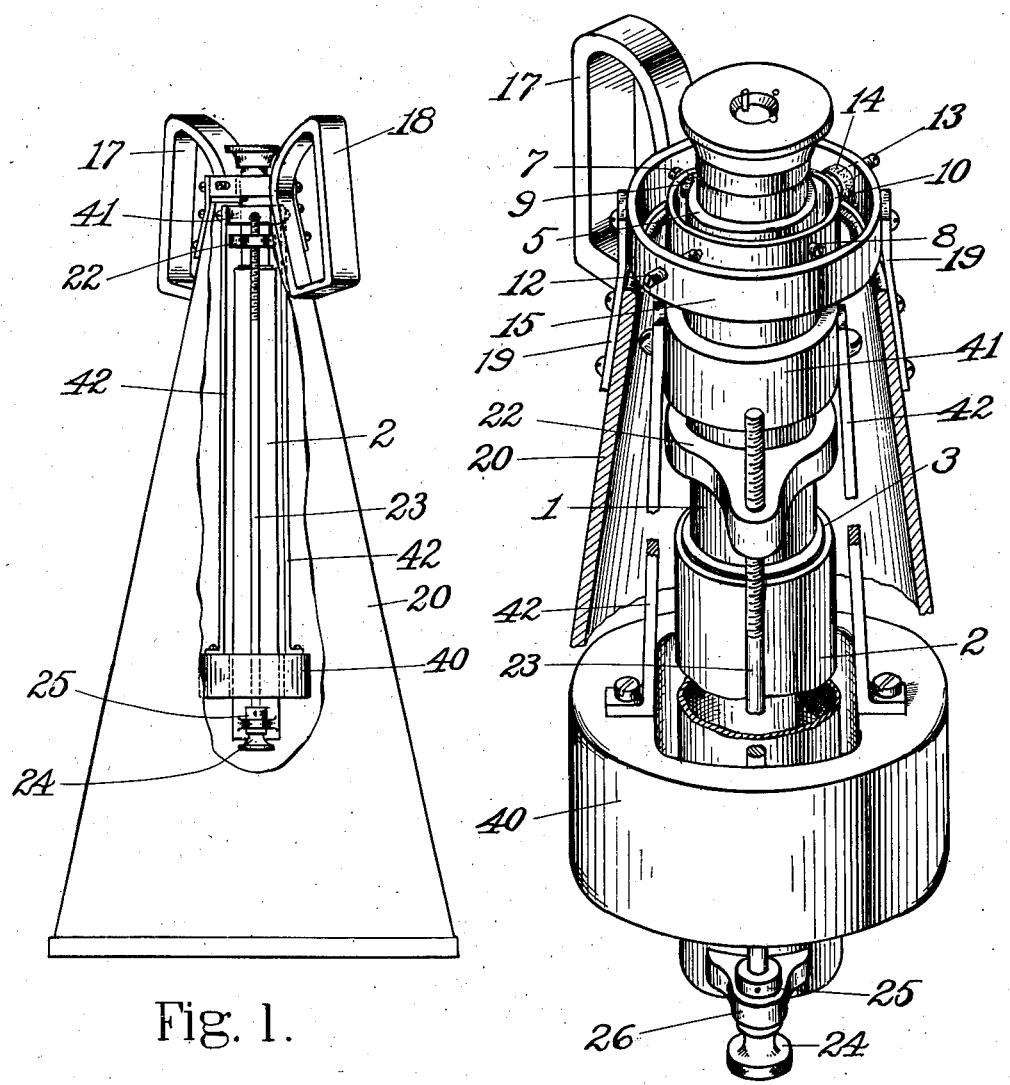

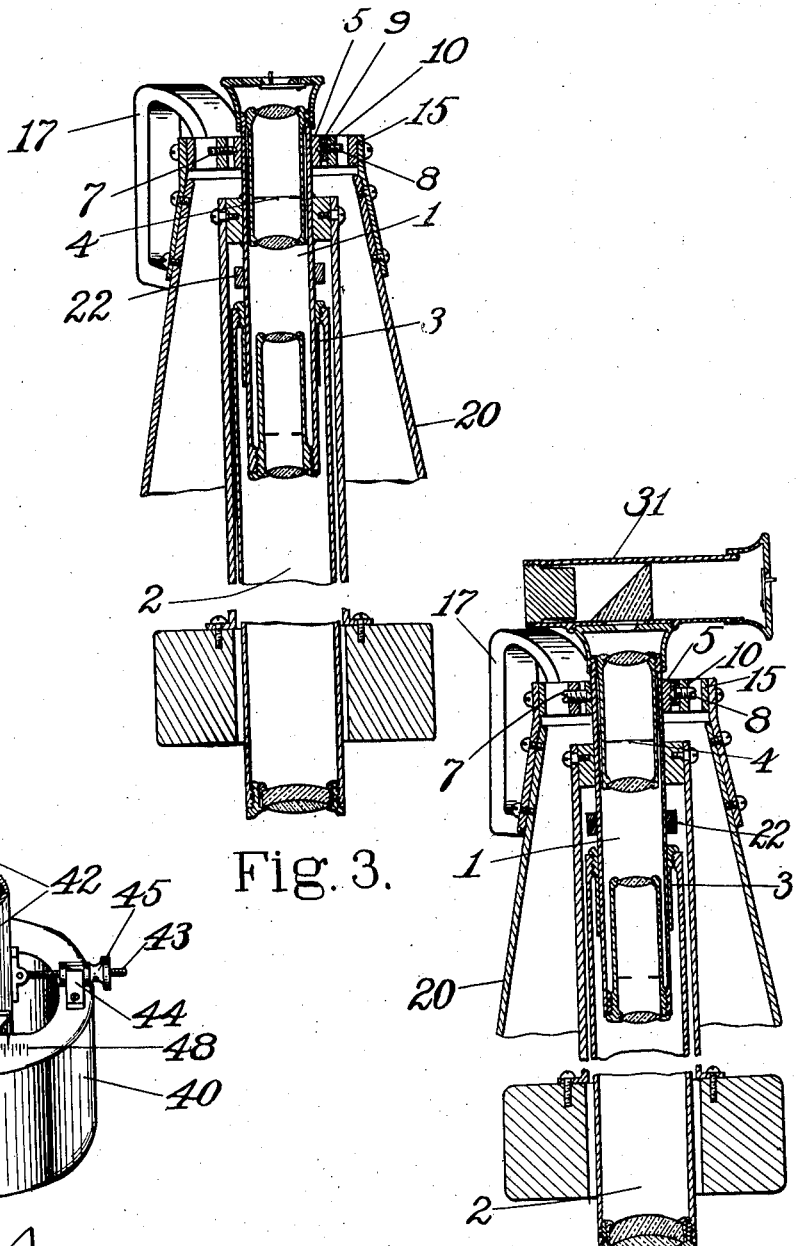

UNITED STATES PATENT OFFICE.

BENJAMIN F. MAYO, OF SALEM, MASSACHUSETTS.

OPTICAL INSTRUMENT.

973,062.     Specification of Letters Patent.     Patented Oct. 18, 1910.

Application filed March 9, 1910. Serial No. 548,168.

*To all whom it may concern:*

Be it known that I, BENJAMIN F. MAYO, a citizen of the United States, residing at Salem, in the county of Essex and State of Massachusetts, have invented certain Improvements in Optical Instruments, of which the following description, in connection with the accompanying drawings, is a specification, like reference characters on the drawings indicating like parts in the several figures.

This invention relates to astronomical and surveying instruments.

Heretofore it has been customary to use the well-known plumb line and bob in work which required plumbing or truing a line or point. The ordinary plumb line and bob are objectionable however, because of inaccuracy and unsteadiness, and because the plumb line must be supported from above the work, and also for the further reason that it cannot be used where work upon an angle or slope is involved, without great care, the taking of many measurements and loss of time.

An object of this invention is to provide a plumbing instrument which may be utilized in place of a plumb line and bob and which will be accurate and reliable in use.

To this end, an object of the invention is to provide a device which may be held at a height, as in the case of a plumb line, to enable the operator to sight downwardly, or which may be used to sight upwardly, and which is also capable of plumbing at any desired angle with the vertical.

It is a further object of the invention to provide means to shield or guard a plumbing device from the deflecting influences of air currents. It will be readily appreciated that air currents, however slight, affect the accuracy of use of a plumb line, while of course a plumb line is rendered useless in a breeze.

An additional object of the invention is to provide an instrument for use in aviation to enable an aviator to locate accurately his position with relation to the surface of the earth. An observer in an aerial craft, when but a short distance above the earth's surface, cannot determine with accuracy what portion of the surface he is vertically over, and when at a considerable height points or places on the surface which are in fact several miles apart will each appear to be as directly under the observer as any other. By means of the mariner's compass, such an observer can readily orient his position with respect to the horizontal plane, and this invention provides an instrument which will enable the observer to ascertain similarly his position with respect to the vertical plane. So far as applicant is aware, this feature of the invention is a distinct novelty in the art and it is desired to claim the same broadly.

Other objects of the invention are to provide an instrument to enable an aviator to determine his height above the earth and the speed of his movement over it, to locate with precision the point upon the earth's surface upon which an article will land when dropped from an aerial craft either while in motion or at rest, and accordingly to provide means to compensate for speed, or for drift caused by an air current, or both; also to furnish a finder to enable an aviator to determine the direction of his line of flight with respect to the surface of the earth over which he may be passing.

The invention contemplates the employment of any suitable device as the sighting means, which means is sustained normally plumb from an appropriate support. Preferably such sighting means consists of a telescope of satisfactory size and power for the purpose for which the device is to be used, but it is within the scope of the invention to employ any suitable sighting means, such as a hollow tube, or a rod, or a plurality of sighting points similar to those used in the art of gunnery, which means are normally sustained in a plumb position. In case a telescope or similar device is employed, it is preferable to equip such device with a reticule or "cross hairs" to more accurately determine the center of the field of view.

In the preferred embodiment of the invention as herein shown, a telescope is utilized as the sighting means through which the observer looks to "true up" or plumb the desired line or point. The telescope is preferably mounted to hang from its uppermost portion, as by means of gimbals or a universal joint, and is arranged to swing freely in any direction. Thus the telescope itself will hang normally plumb irrespective of the angle at which the supporting means may be held. In order to obviate the action of air currents and winds which might deflect the telescope from its normally plumb position, a circular guard or shield partially surrounding the telescope may be conveniently attached to the supporting means from which the telescope is hung. The supporting means, including the wind guard may be provided with handles to be grasped by the observer as he sights downwardly, and it may also be arranged to stand upon a bench or upon the ground for sighting upwardly.

When the device is used for sighting upwardly it is preferable to have a horizontal eye-piece, and a horizontal eye-piece may also be mounted upon the instrument when intended to be used for sighting downwardly.

In order to incline the telescope at any desired angle out of plumb, as, for example, in sighting along the slope of a church steeple or for use in aviation as above mentioned, means is provided to adjust the barrel of the telescope into and out of plumb with great exactness and in accordance with a scale. Said means comprises an additional plumbing device, preferably a weight heavier than the telescope, which weight is also hung from gimbals and arranged in immediate proximity to the telescope with an adjustable connection between the weight and the telescope. Preferably this weight is in the form of an annulus, arranged to be swung from the upper portion of the telescope just below the supporting gimbals and with the barrel of the telescope passing through its center. A sufficient space is provided between the inner diameter of the annulus and the outer diameter of the barrel to permit an adjustable connection which will preferably comprise means whereby the barrel of the telescope may be quickly positioned and held at any desired angle relatively to the annulus, the latter being of sufficient weight to insure that it will still hang substantially plumb irrespective of the slight lateral pressure put upon it by the deflection of the barrel of the telescope through the action of the adjusting means in moving and holding said barrel out of plumb. Of course any movement of the telescope out of plumb through lateral pressure upon the weight tends to deflect said weight proportionally in the opposite direction from that in which the telescope is swung. However, the scale which is used to indicate the angle of the telescope in its various adjustments is so constructed as to equate the deflection of the annulus by the telescope and indicate correctly the obliquity of the line of sight.

Other important features, combinations of parts, and details of construction will be hereinafter more particularly described and claimed.

Referring to the drawings, illustrating a preferred embodiment of the invention, Figure 1 is a general view of my complete device, with a portion of the wind shield broken away; Fig. 2 is a view in perspective upon an enlarged scale, with a small portion of the wind shield in cross section; Fig. 3 is a longitudinal sectional view of the device; Fig. 4 is a detailed view of the means of adjustment between the weight and the telescope; Fig. 5 is a view, in longitudinal section, of the device with a horizontal eye-piece for sighting downwardly; and Fig. 6 is a view, also in longitudinal section, of the device arranged for sighting upwardly.

In the drawings, the numeral 1 designates that portion of a terrestrial telescope containing the eye-piece, and 2 designates the objective end, the portions 1 and 2 being arranged to slide relatively with each other upon the bearings of the member 3 in the usual manner. The cross-hairs are indicated by 4 at a diaphragm of the eye-piece. The telescope is arranged to be sustained at its upper end by a universal joint connection. As herein shown this connection is by means of gimbals, comprising a collar 5 upon the eye-piece in Figs. 1, 2, 3 and 5, or upon the barrel 2 as shown in Fig. 6, adjustable pins 7 and 8 threaded through an intermediate ring 10 and bearing in suitable recesses in the collar 5, and an outer ring 15 having pins 12 and 13 similarly bearing in recesses in the intermediate ring 10. The pins 7 and 8 are diametrically opposed and the pins 12 and 13 are also diametrically opposed and on a diameter at right angles to the former, the four pins being in the same plane as is customary. If desired, friction washers 9 and 14 may be used as shown in Fig. 2 to prevent too free a movement of the gimbals. By this construction the telescope is sustained normally plumb. Two handles 17 and 18 are provided for the convenience of the observer and such handles are secured by any appropriate means to the outer gimbal ring 15, being preferably attached to said ring in substantially the same plane in which the pins 12 and 13 lie. A wind shield 20 is also attached to the ring 15 by any suitable connection, such as straps 19, and is preferably in the form of a hollow truncated cone with the flaring end or base positioned downwardly. Said shield may be of any length sufficient to properly protect the device sustained within it from the deflecting influences of air currents and is herein shown as of slightly greater length than the portion 2 of the telescope. Such a shield is adaptable to similarly protect a plumb line and bob or any like plumbing device.

Means to adjust the portions 1 and 2 of the telescope relatively with each other is provided comprising a collar 22 upon the barrel of one portion, a suitable lug 26 on the other portion and the connecting rod 23, thumb nut 24 and collar 25 as clearly shown in Fig. 2.

If desired the device may be provided with a horizontal eye-piece 31 for sighting downwardly, as illustrated in Fig. 5. When the sighting means is arranged for sighting upwardly, as illustrated in Fig. 6, it is desirable to affix a horizontal eye-piece 30 with a prism 28, or similar deflector, such construction being well known in the art. In the arrangement shown in Fig. 6, an aperture 32 is provided in the wind shield 20 for the horizontal eye-piece 30 to project through in case it is preferred to have said shield extend below the eye-piece. In this construction also three or more adjusting screws 33 are provided to position the device firmly on the ground, stand, or other support, when used for sighting upwardly. An adjustable point 36 is provided as also shown in Fig. 6 to aid the observer in accurately positioning the device over a station point, and a window 37 in the shield 20 affords a convenient means for observing when said point is in position.

As thus far described, the sighting means is sustained normally plumb, and to position and to hold said means out of plumb additional means, also normally sustained plumb, is provided with a connection between the sighting means and such additional means. This means is preferably a weight 40 arranged in the form of an annulus to encircle the lower portion of the telescope and supported by rods 42, 42 attached to a collar 41 secured to the upper part of the telescope just below the collar 5. If desirable, said weight may be supported from the collar 5 or otherwise from the gimbals. The inner diameter of the annulus 40 is sufficiently larger than the exterior diameter of the telescope to leave ample space for the adjustments about to be described.

In Fig. 4 is shown in detail an adjustable connection between the weight 40 and the lower portion of the telescope comprising a threaded rod 43 pivotally attached to the barrel of the telescope and extending through a lug 44 on the weight 40. A thumb nut 45 is threaded on said rod 43 and bears against the lug 44. Manipulation of the thumb nut 45 serves to move the barrel of the telescope relatively to the weight 40 and to hold it in the position to which it is moved. A pointer 47 affixed to the side of the telescope and a suitable scale 48 on the weight are provided to indicate the angle or amount of relative movement of the weight and the telescope. As this movement just described is upon one diametrical line, the annulus 40 is preferably formed with the interior opening of greater diameter in the direction of such movement only, as illustrated in Fig. 4.

Preferably the weight of the annulus 40 is so much greater than that of the telescope that the annulus will hang substantially plumb when the telescope is out of plumb. However, the weight of the telescope when in an oblique position tends to deflect slightly the annulus 40 in the opposite direction from that in which the telescope is inclined. Therefore, the scale 48 is so proportioned that these opposite movements of the annulus and telescope are equated and the scale will always indicate the exact angle of the line of sight of the telescope with the true vertical.

In operating the device the observer if at a height grasps the handles and sights downwardly, adjusting the telescope to proper focus, and as the telescope itself is sustained normally plumb, the observer obtains an exact vertical sight. By means of the adjustable connection between the weight and the telescope, the latter may be positioned to a desired line of sight at an angle to the vertical.

In operating the device for sighting upwardly the observer may either grasp the handles and hold it, or may position it upon the ground, a stand, bench, or the like.

In using the device of the invention in aviation, an observer can at any time determine what point on the earth's surface he is exactly over by simply sighting downwardly through the telescope when it is plumb. The speed is easily reckoned by noting the time when the observer is vertically over one point, and again when vertically over a second point on the surface, the distance between the two points being known. The height may be obtained with equal accuracy by noting the angle at the point of observation between the vertical and the line of sight to a point on the earth's surface at one side, if the distance on the surface between such point and the point vertically beneath the observer is known, since from two angles and the length of one side of a triangle the lengths of the other sides may readily be determined.

To locate on the earth's surface the spot where an article dropped from an aerial craft will land, if the observer knows the speed of such craft across and the height above the surface he can adjust the telescope at the proper angle to compensate for such speed and height and thus determine with precision the point on the surface where said article will land. If it was desired that the article should land at a particular point on the earth's surface the observer can adjust or set the instrument at the proper angle to compensate for speed and height and observe when the desired point came into his range of vision and then drop the article. In time of war, the device can be advantageously used to locate a point on the earth's surface upon which an article containing explosives will strike.

The wind shield may be used advantageously as a finder, and to this end the construction herein shown provides a substantially uninterrupted observation between the rings of the gimbals and between the annulus 40 and the shield.

In utilizing the wind shield as a finder, an aviator can determine the direction of the line of flight relatively to the earth's surface by noting the direction objects on the surface would seem to take in passing across the field of vision of the shield. As such shield is of flaring form with a large objective field of view the observer can readily see whether his line of flight would take him directly over a certain point on the earth's surface and, if not, he can perceive what direction must be taken by the aerial craft in order to place it over or nearly over such point.

Another instance of the utility of the device of this invention is that it may be substituted for a plumb line and bob in a surveyor's transit and the transit can then be located over a station point of departure much more quickly and accurately than with the use of the plumb line and bob.

Having described my invention, what I claim as new and desire to secure by Letters Patent of the United States is:—

1. In a device of the class described, sighting means and supporting means therefor arranged to sustain said sighting means normally plumb.

2. In a device of the class described, means for sighting downwardly from the point of observation, and supporting means arranged to sustain said means normally plumb.

3. In a device of the class described, sighting means sustained normally plumb, and means to move said sighting means out of plumb.

4. In a device of the class described, sighting means sustained normally plumb and means to hold said sighting means out of plumb.

5. In a device of the class described, sighting means sustained normally plumb and means for adjusting said sighting means into a position at a desired angle with the vertical.

6. In a device of the class described, sighting means, a support therefor arranged to sustain said means normally plumb and means to locate the center of the field of view of said sighting means.

7. A device of the class described, comprising a telescope, and supporting means therefor arranged to hold the telescope normally plumb.

8. A device of the class described, comprising a telescope, supporting means therefor arranged to hold the telescope normally plumb, and means to move said telescope out of plumb.

9. A device of the class described, comprising a telescope, supporting means therefor arranged to hold the telescope normally plumb, and means to move said telescope out of plumb and to hold it in the position to which it is so moved.

10. A device of the class described, comprising a telescope, supporting means therefor arranged to hold the telescope normally plumb, and means to locate the center of the field of view.

11. A device of the class described, comprising a telescope, supporting means therefor arranged to hold the telescope normally plumb, and a shield for preventing deflection of the telescope from normal position.

12. A device of the class described, comprising a telescope, supporting means therefor arranged to hold the telescope normally plumb, and means to prevent deflection of the telescope from normal position by the action of air currents.

13. A device of the class described, comprising a telescope, supporting means therefor arranged to hold the telescope plumb, and a wind shield connected to said support.

14. A device of the class described, comprising a telescope, supporting means therefor arranged to hold the telescope normally plumb, and a wind shield surrounding the telescope.

15. A device of the class described, comprising a telescope, supporting means therefor arranged to hold the telescope plumb, and a wind shield having the form of a hollow truncated cone partially inclosing said telescope and connected to said support.

16. A device of the class described, comprising a telescope, supporting means therefor arranged to hold the telescope plumb, and a wind shield surrounding the telescope, said parts being constructed to permit sight through the shield between the telescope and the shield.

17. A device of the class described, comprising a telescope, supporting means therefor arranged to hold the telescope plumb, and a circular flaring wind shield attached to said support and surrounding the telescope, said parts being constructed to permit sight through the shield between the telescope and shield.

18. A device of the class described, comprising a telescope, supporting means therefor, a universal joint connection between said support and the upper portion of said telescope, and a wind shield connected to the support, said shield being in the form of a hollow truncated cone and arranged to partially surround the telescope, the universal joint connection being constructed to permit sight through the shield between the telescope and the shield.

19. A device of the class described, comprising a telescope, supporting means therefor arranged to hold the telescope normally plumb, and means for adjusting said telescope into a position out of plumb.

20. A device of the class described, comprising a telescope, supporting means therefor arranged to hold the telescope plumb, additional means sustained by said supporting means and a connection between said telescope and said means whereby the telescope may be moved to and held in a position out of plumb.

21. A device of the class described, comprising a telescope, a support therefor arranged to hold the telescope plumb, additional means sustained normally plumb from said support, and an adjustable connection between said telescope and said means whereby the telescope may be moved to a position out of plumb while said means remains substantially plumb.

22. A device of the class described, comprising a telescope, a support therefor arranged to hold the telescope plumb, additional means sustained normally plumb from said support, and means to adjust the telescope to an oblique position, while said additional means is maintained in substantially plumb position.

23. A device of the class described, including a telescope, a support therefor arranged to hold the telescope plumb, means heavier than the telescope sustained normally plumb from said support, and an adjustable connection between said means and the telescope to move the telescope to a position at an angle to the vertical.

24. In an apparatus of the class described, a support, a sighting device arranged to hang normally plumb from said support, and means to prevent deflection of said device from normal position by air currents.

25. In a device of the class described, a telescope supported at its uppermost portion by gimbals and means to steady the gimbals.

26. In a device of the class described, a telescope supported at its uppermost portion by gimbals and a handle secured to said gimbals in substantially the same plane with the pivot pins of said gimbals.

27. In a device of the class described, a telescope supported at its uppermost portion by gimbals, washers on the gimbal pins, a handle secured to said gimbals in substantially the same plane with the pivot pins and a wind shield supported by said handle.

28. In a device of the class described, a telescope supported at its uppermost portion by gimbals, a weight heavier than said telescope sustained normally plumb by said gimbals, and an adjustable connection between the weight and the telescope whereby the line of sight of the telescope may be moved to a position at a desired angle with the vertical.

In testimony whereof I have signed my name to this specification in the presence of two subscribing witnesses.

BENJAMIN F. MAYO.

Witnesses:
JAMES R. HODDER,
FREDERICK L. EDMONDS.